May 1, 1962 C. P. VILLARS 3,032,610

ENCODERS FOR PCM CODES OF BASE GREATER THAN TWO

Filed March 22, 1960 2 Sheets-Sheet 1

INVENTOR
C. P. VILLARS
BY R. B. Andis
ATTORNEY

INVENTOR
C. P. VILLARS
BY R. B. Anderson
ATTORNEY

United States Patent Office 3,032,610

Patented May 1, 1962

3,032,610

ENCODERS FOR PCM CODES OF BASE GREATER THAN TWO

Claude P. Villars, St. Prex, Switzerland, assignor to Bell Telephone Laboratories, Incorporated, New York, N.Y., a corporation of New York Filed Mar. 22, 1960, Ser. No. 16,812
7 Claims. (Cl. 178—43.5)

Figure 1:
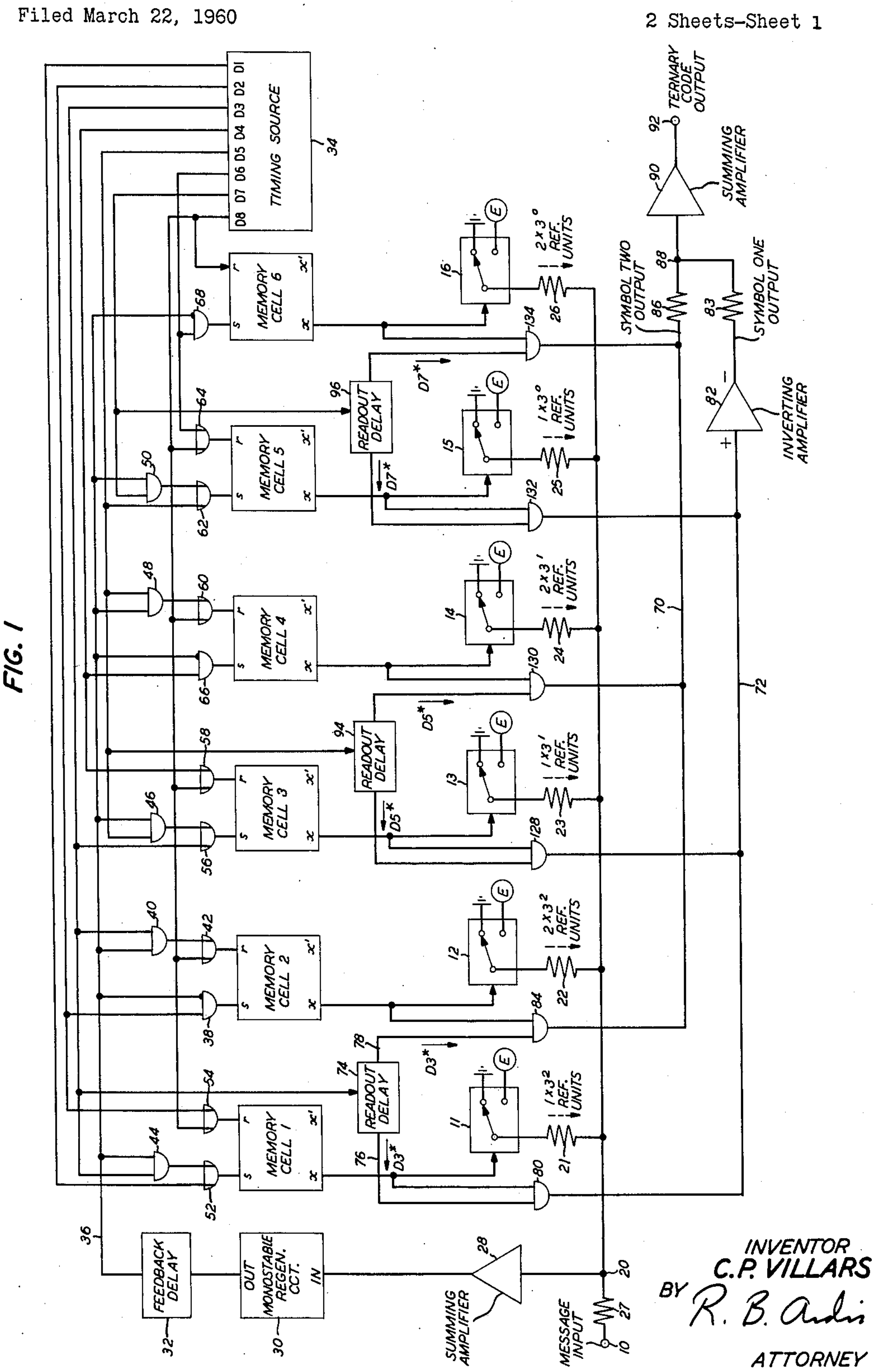

This invention relates to pulse code modulation (PCM) systems and, more specifically, to PCM systems that employ permutation codes having bases of three or higher. The invention will be described with reference to an illustrative encoder that converts analog quantities to a ternary code.

In existing PCM systems employing a binary code, reactive couplings (transformers or capacitors, for example) cause pulse trains, consisting of pulses lying only on one side of the zero reference level, to drift over to the other side of that level. This phenomenon is commonly called "zero drift." To avoid it, trains of special pulses, e.g., dipulses or bipulses, are employed as code elements. And to retain the advantages of binary PCM, these trains consist only of positive, zero, or negative values. Further breakdown of the positive and negative values, each into many levels (e.g., $+1$, $+2$, . . . $+k$; $-1$, $-2$, . . . $-k$, etc.), would elicit the disadvantages of pulse amplitude modulation. Now, if these three-leveled pulse trains are to be used in a binary system, often the only advantage to be gained is avoidance of the "zero drift" phenomenon. Since the system is capable of such multilevel transmission, it would be more efficiently employed if these levels were used for a permutation code of base greater than two. Better resolution of the original analog signal could be achieved, while retaining the same number of digits per code group if, for example, a ternary code were employed. As a corollary, moreover, a ternary code could achieve the same resolution as can a binary code, while reducing the number of digits required to so resolve the analog signal. Such a reduction would produce a concomitant reduction in the system bandwidth necessary to accommodate the encoded wave.

Encoders of base greater than two are known in the art. See, for example, the beam-type ternary encoder of patent No. 2,602,158, which issued to R. L. Carbrey on July 1, 1952; and the network-type encoder of base nine disclosed in Patent No. 2,902,542, which issued to C. G. Treadwell on September 1, 1959. To date, however, such encoders apparently have been overlooked as a practical means of analog-to-digital conversion, perhaps mainly because they have not posed a serious economic threat to their binary counterparts.

It is, therefore, a principal object of this invention to place "hyperbinary" encoders (i.e., encoders producing codes having bases greater than two) on a competitive basis with the binary variety now firmly entrenched in the PCM art. More specifically, the object is to decrease the bandwidth requirements of present PCM systems while preserving transmission capacity, or to increase their transmission capacity while retaining the same bandwidth, and to accomplish either of these ends with minimal circuit complexity.

In accordance with the invention, a hyperbinary encoder of the feedback type (sometimes referred to alternatively as the "weighing" type—see, e.g., British Patent No. 820,923 of issue date September 30, 1959 which classifies encoders into three classes, viz.: counting, weighing, and raster) is arranged so that a minimum number of message-reference comparisons is needed to determine the value of any digit coefficient (see the text accompanying Equation 3 below). Although a code of base greater than two is produced, the need for a multilevel decision circuit is obviated. A common monostable regenerative circuit is employed to determine the significance of the residue product of each message-reference comparison. Memory cells store the results of these determinations. Read-out circuits extract this cell information and transform it into a wave consisting simply of positive or negative pulses having the same absolute magnitude. A timing generator and logic circuitry are provided to ensure a logical and scheduled analog to digital conversion.

Figure 2:
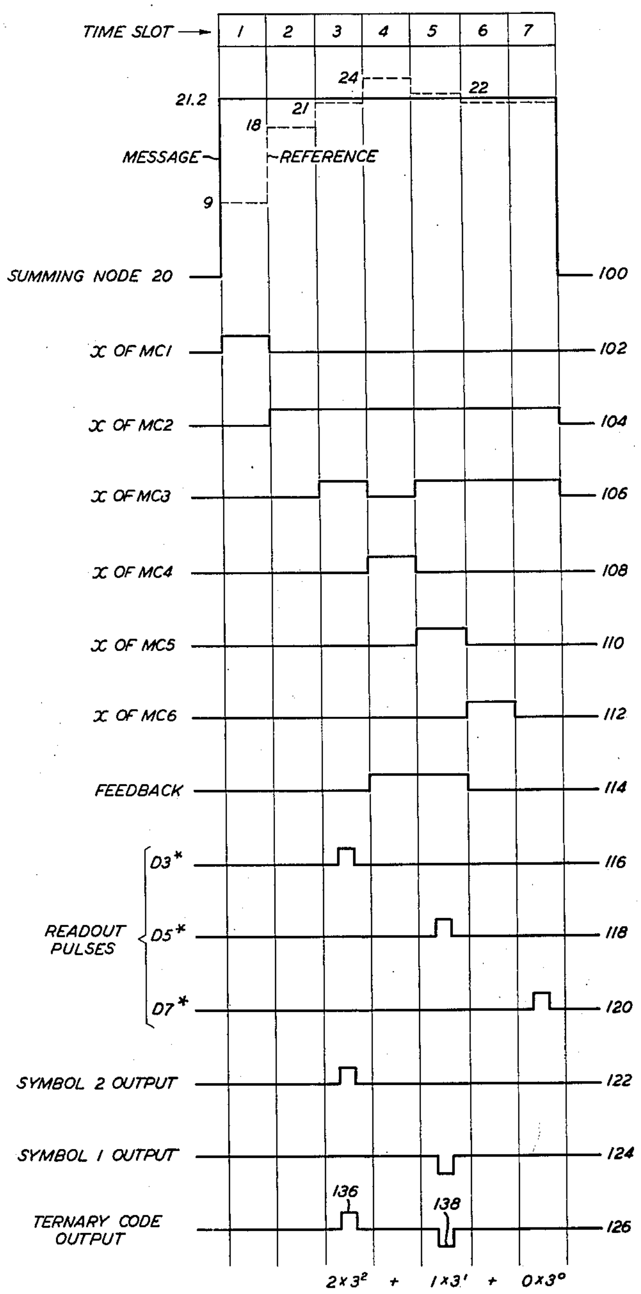

The invention will be better understood if the description which follows is read in conjunction with the drawing in which:

FIG. 1 is a block schematic diagram of a ternary encoder arranged in accordance with the invention; and FIG. 2 is a plot of electrical waveforms which are manifest at various indicated points in the circuit of FIG. 1.

The encoder of FIG. 1, as mentioned above, falls within the class of encoders commonly characterized as feedback encoders. A feedback encoder is one in which message and reference currents are successively compared, the results of each message-reference comparison being fed back by way of logic circuitry to control the generation of succeeding reference currents. The unique feature of the encoder of FIG. 1 is that it retains substantially all of the simplicity of binary feedback encoders (compare, for example, the piecewise-linear binary encoder of C. P. Villars, co-pending application Serial No. 813,776, filed May 18, 1959), yet it permits the generation of a ternary code with all of the advantages previously mentioned. PCM systems adapted to transmit binary code in the form of positive and negative pulses may, in accordance with the invention, be more efficiently employed. In FIG. 1 these pulses, instead of representing a binary code, represent a ternary code, and are therefore capable of conveying much more information. Better definition of analog samples is thereby afforded. At the same time, no bandwidth disadvantage need be thrown onto the ternary side of a "binary versus ternary scale," since the bandwidth of a system is directly proportional to the number of code elements or digits required to be transmitted, and this number is unaffected even though sample resolution is enhanced. Moreover, the noise advantage of a ternary system, arranged in accordance with the invention, remains the same as in binary systems (compare, in this respect, the Treadwell patent cited above). All of this is accomplished simply and economically, as a description of the illustrative embodiment of FIG. 1 will show.

In general, for a permutation code of base $b$, a code value $x$ may be expressed by the equation $$x=\sum_{i=0}^{N-1} a_i b^i \qquad (1)$$

where $a$ is the multiplication coefficient and equals 0, 1, 2, . . . $(b-1)$; $b$ is the base; $i=0, 1, 2, \ldots (N-1)$ and indicates the order of significance of each digit and its associated coefficient; and N equals the number of digits employed per code group. Thus for a ternary code, $$x=a_0 3^0+a_1 3^1+a_2 3^2+ \ldots a_{N-1} 3^{N-1} \qquad (2)$$

where each of the $a$ coefficients may equal 0, 1, or 2. The absence of a pulse at the output 92 (FIG. 1) of the illustrative encoder to be described, means that the $a$ coefficient is equal to zero for the particular digit at hand. If a positive pulse is there present, the digit's coefficient is known to be two. A negative pulse calls for a coefficient of one.

In the discussion which follows, the character and function of the various elements of FIG. 1 will first be described; next, theoretical considerations will be dealt with; and, finally, a typical message sample will be taken through the various processes it must undergo in its conversion from analog to digital form. It should be noted that the circuit of FIG. 1 has been depicted in a very simple way. Obfuscating details have been avoided. As a consequence, the nature of the invention will be grasped with little, if any, difficulty.

Message samples are fed into the input 10, through the input resistor 27, to the summing node 20. Reference currents originating at the potential source E, pass through the various reference resistors 21—26 whenever their respective switches 11—16 connect them to the source E. The reference currents have been expressed in "reference units" and illustrative numerical values have been given them. These units of reference current may be, for example, milliamperes or microamperes, etc., the choice depending upon the magnitude of the message sample.

The six reference resistors 21—26 consist of three associated pairs 21 and 22, 23 and 24, and 25 and 26. The ohmic values of all of the resistors are related to one another as are the powers of 3. But in each of the pairs, the ohmic value of one of the resistors is twice that of the other. Thus, for example, the resistor 21 has an ohmic value twice that of the resistor 22, as indicated by the fact that twice as much current passes through resistor 22 as does through resistor 21. Reference current meets the message current at the summing node 20, whereupon their sum is fed into the summing amplifier 28. The amplified product of this sum is then fed into the monostable regenerative circuit 30.

The circuit 30 may be a Schmitt circuit of a type described in almost any authoritative electronics textbook. See, for example, Reference Data for Radio Engineers, page 468 (4th edition, 1956). In the circuit of FIG. 1, it will be assumed that the message sample is positive and that the reference source E provides a negative reference potential. It will further be assumed that there is no phase reversal in the summing amplifier 28. Whether or not a pulse will be generated at the output of circuit 30 depends upon the polarity of the current fed into its input. When the polarity of this signal is positive (i.e., when the absolute magnitude of the message sample is greater than that of the reference current fed into summing node 20) no pulse will be generated at the output circuit 30. Conversely, when the polarity of the current supplied to the input of circuit 30 is negative, a pulse will be generated at its output. The duration of the pulse will be coextensive with the period of time during which the input of circuit 30 is at a negative potential, i.e., during which the magnitude of the reference current is greater than that of the message sample.

Connected to the output of circuit 30 is a delay circuit 32 which provides a delay interval sufficient to insure that the logic and other operations performed in each of the branches of the encoder during their respective time slots will be fully performed without the interference of any pulse that may then be manifest at the output of circuit 30. The necessity for the delay provided by delay circuit 32 will become more apparent as the discussion progresses.

Timing signals, which are necessary for the operation of any encoder, are provided by the timing source 34. At each of the times D1 through D8, a timing pulse will be supplied to various elements of the circuit by a respective output of timing source 34. Timing source 34 is shown as having eight outputs, since, in the illustrative encoder of FIG. 1, eight time slots are employed. The first seven, determined by the timing pulses D1 to D7, are employed for code purposes. The eighth time slot, determined by the timing pulse D8, is employed to reset the various memory cells of the encoder.

The memory cells 1 through 6 are bistable circuits which may be of the conventional Eccles-Jordan type. Each cell has a set input *s* and a reset input *r*. When a pulse is manifest at the *s* input of any of these memory cells, the cell is "set" in one of its states of equilibrium such that its *x* output is in the binary "1" state, i.e., a pulse is there manifest. For present purposes, it will be assumed that this pulse is positive. When, on the other hand, a pulse is manifest at the *r* input of a memory cell, the cell will be switched to its other state of equilibrium, in which case the *x* output will be in the binary "0" state, i.e., will be at a zero potential.

Various logic elements couple each of the memory cells 1 to 6 to the feedback conductor 36 and specific ones of the timing outputs of timing source 34. These logic elements are depicted in conventional fashion. Take, for example, the logic elements servicing memory cell 2. The element 38 is an inhibit gate. So long as a pulse is manifest on the feedback conductor 36, no pulse can be produced at the output of the inhibit gate 38. The element 40 is an AND gate. A pulse will be produced at its output only when there is a concurrence of impulses at both of its inputs. The element 42 is an OR gate and a pulse will be produced at its output whenever an impulse is supplied to either of its inputs. Thus, according to the convention used, the elements 44, 46, 48 and 50 are AND gates, the elements 52, 54, 56, 58, 60, 62 and 64 are OR gates, and the elements 66 and 68 are inhibit gates.

Each of the message-reference comparisons at the summing node 20 will ultimately determine the states of equilibrium of the memory cells 1 to 6. The information stored in these cells is read out at appropriate times by read-out circuits connected to the read-out conductors 70 and 72. Read-out operations are performed at times D3, D5 and D7.

At time D3, for example, the timing source 34 supplies a pulse to the read-out delay circuit 74. The delay interval provided by the delay circuit 74 is less than the duration of one time slot and is determined as practical necessity dictates. After this interval has expired, the timing pulse D3 emerges from each of the outputs 76 and 78 of delay circuit 74 as a delayed timing pulse D3*. If the output terminal *x* of memory cell 1 is then in the binary "1" state, the AND gate 80 will be enabled and a pulse will be supplied to the read-out conductor 72. This pulse (which we will assume is positive) will emerge from the inverting amplifier 82 as a negative pulse and appear at the output summing resistor 83 as a "symbol one output" of the encoder. "Symbol one" is here used to signify one of the values that the coefficient *a* of the ternary code may assume.

The "symbol one output" is thus a negative pulse and indicates that a particular digit is to be multiplied by a coefficient of one. If, for example, the *x* output of memory cell 1 is in the binary "1" state at time D3*, the ternary code output of the encoder at that time will be a negative pulse representing a code value of $1\times3^2$ units.

If, on the other hand, the *x* output of memory cell 1 is in the binary "0" state (no pulse) at time D3*, the binary state of the *x* output of memory cell 2 may be either "0" or "1". If the state is "1", then AND gate 84 will be enabled. A positive pulse ("symbol two output") will appear at the output summing resistor 86, be passed on to the ouput summing node 88, thence to the summing amplifier 90, and finally to the encoder output 92, where its presence will be interpreted in code units as $2\times3^2$. A "symbol two output" is thus a positive pulse and indicates that a particular digit is to be multiplied by a coefficient of two.

In sum, the encoder of FIG. 1 comprises a reference current generating network made up of N pairs of resistance branches (the resistors 21 to 26), where N is the number of digits employed by the code — here three. The number of resistance branches is, in other words, determined by the number of message-reference comparisons which must be made to determine the values to be assigned the coefficients $a_i$ (see Equation 1 above). The encoder further comprises logic and timing circuitary to synchronize and control the determination of each $a$ coefficient and to proceed from one digit to the next. Read-out networks are employed to appraise the information stored in the memory cells 1 to 6 and to pass each of these appraisals in appropriate pulse form to the output 92.

It will be helpful to consider some of the theoretical aspects of the invention. The coefficients $a_i$ (see Equation 1 above) are determined in the order of their significance. The encoder of FIG. 1 thus begins by determining the value to be ascribed to the coefficient $a_{(N-1)}$, the most significant coefficient. In an encoder of base 5, for example, the order of determination would be $a_4$, $a_3$, $a_2$, $a_1$, $a_0$. Each of the coefficients $a_i$ may assume $b$ different values including zero. In the quinary example, each of the coefficients $a_i$ may assume any of the values 0, 1, 2, 3 or 4. An encoder arranged in accordance with the invention is so organized that it will require only "$m$" message-reference comparisons to determine the value to be ascribed to an $a$ coefficient. The number $m$ is the smallest integer that will satisfy the expression:

$$2^m \geq b$$

After the most significant coefficient, $a_{(N-1)}$, has been determined, the reference network, which here consists mainly of the resistor branches 21 to 26, conveys to the summing node 20 a reference current of magnitude equal to $a_{(N-1)}b^{(N-1)}$. The message-reference comparison at node 20 will result in a residue or difference signal $\Delta$ equal to $$\Delta = y - a_{(N-1)}b^{(N-1)} \qquad (4)$$

where $y$ is the magnitude of the message input sample. This residue is then used to determine the next $a$ coefficient, that is, $a_{(N-2)}$. The process continues until the least significant digit, that is $a_0$, has been determined.

In a ternary system each of the coefficients $a$ may assume any one of three values (see text immediately following Equation 2); yet, in accordance with the invention, only two decisions, i.e., message-reference comparisons, are necessary to arrive at the correct value of any coefficient, since $2^m$ is greater than $b$ (see Equation 3). Even in a system of base 4, only two decisions will be required in an encoder arranged as taught by the invention, for, with $m=2$ and $b=4$, Equation 3 is still satisfied. On the other hand, presently known PCM systems having bases greater than 2 (so-called "hyperbinary" systems) require at least as many independent decisions as there are possible coefficient values other than zero.

It is a further advantage of the invention that a decision circuit of the type ordinarily employed in binary encoders (the monostable regenerative circut 30) may be used in hyperbinary encoding processes. In such a decision circuit it is only necessary to decide whether the residue signal $\Delta$ is greater or less than zero. In contradistinction, presently known hyperbinary systems of the network type employ multilevel decision circuits which must accurately determine the incremental level in which the residue signal falls. In such multilevel decision circuits, all reference levels must be accurately maintained. A decision circuit of the type employed in FIG. 1, however (the monostable regenerative circuit 30), is such that the circuit need only determine the polarity of the residue signal $\Delta$ in order to ascertain the significance of the message-reference comparisons which occur at summing node 20.

It should be apparent, therefore, that one of the principal advantages afforded by the invention is evidenced by the fact that with minimal increases in circuit complexity, permutation codes having bases greater than two can be achieved. For example, with only two message-reference comparisons, each of the coefficients $a_i$ can be determined for a ternary code as well as for a quadrinary code. Thus, in accordance with the invention, a quadrinary encoding process may be achieved with the basic circuit of FIG. 1, without increasing the complexity of the reference network. As a consequence, the number of $m$ message-reference comparisons necessary for the determination of each of the coefficients $a_i$ is kept at a minimum and a simple monostable regenerative circuit (circuit 30) is all that is needed to determine the significance of each message-reference comparison.

A specific message sample will now be assumed in order to explain the various operations that the circuit of FIG. 1 will undergo in converting the sample to a ternary code. In considering these operations, reference will often be made to the waveforms plotted in FIG. 2. Waveform 100 is a plot of the message and reference currents which meet at the summing node 20 of FIG. 1. A message sample of 21.2 units has been assumed for the purpose of this description. Since we have assumed throughout this specification that the source E provides a negative reference potential, it should be noted that the reference current as shown in waveform 100 of FIG. 2 is an absolute magnitude.

Waveform 102 depicts the binary state of the $x$ output terminal of memory cell 1 throughout the seven time slots during which the message sample is converted to a ternary code. As mentioned previously, although eight time slots are used in the illustrative encoding process, the eighth time slot serves merely to reset the various memory cells of the encoder of FIG. 1. Accordingly, only seven time slots need be shown in FIG. 2. The waveform 104 depicts the binary state of the $x$ output terminal of memory cell 2 of FIG. 1. The binary states of the $x$ output terminals of memory cells 3, 4, 5 and 6 depicted by the waveforms 106, 108, 110 and 112, respectively. The signal fed out of the monostable regenerative circuit 30 into the feedback delay circuit 32 of FIG. 1 is shown as waveform 114 in FIG. 2. The read-out pulses D3*, D5* and D7*, emerging, respectively, from the read-out delay circuits 74, 94 and 96, are depicted by the waveforms 116, 118, and 120, respectively. The "symbol two output" appearing at the output summing resistor 86 of FIG. 1 and the "symbol one output" appearing at the output summing resistor 83 are illustrated by the waveforms 122 and 124, respectively. Finally, the ternary code appearing at the output terminal 92 of the encoder of FIG. 1 is depicted by waveform 126 of FIG. 2.

Assume, then, that the message sample fed into the input terminal 10 of the encoder of FIG. 1 has an absolute magnitude of 21.2 analog units. At time D1 (the first time slot), the timing source 34 feeds a timing pulse into the OR gate 52 and thereby activates the memory cell 1. The $x$ output terminal of memory cell 1, being thus cast into the binary "1" state, activates the switch 11, which in turn connects the resistor 21 to the reference source E. A current of $1\times3^2$ units is fed into the summing node 20 where it is compared with the message input sample of 21.2 units. This comparison determines that the message sample is greater in absolute magnitude than is the reference current. Consequently, the circuit 30 produces no output pulse.

At time D2 (the second time slot) a timing pulse is supplied by the timing source 34 to the OR gate 54 and the inhibit gate 38. Memory cell 1 is reset so that its $x$ output terminal reassumes the binary "0" state and the switch 11 is switched from the potential source E to ground. Current through the resistor 21 therefore ceases. Since, as was mentioned, no output pulse was produced by the circuit 30 at time D1, no pulse will be present on the feedback conductor 36 at time D2. Consequently, the inhibit gate 38 is uninhibited and the D2 timing pulse will set the memory cell 2, thereby placing its $x$ output terminal in the binary "1" state and causing switch 12 to connect the resistor 22 to the reference source E. A current of $2\times3^2$ units is now supplied to the summing node 20 where it is compared with the message sample of 21.2 units (see waveform 100). Realizing that the absolute magnitude of the reference current is still less than that of the message current, the circuit 30 again produces no output pulse.

At time D3 (the third time slot) a timing pulse is supplied by the timing source 34 to the read-out delay circuit 74, the AND gate 40, and the OR gate 56. Since no feedback pulse is present on the feedback conductor 36, AND gate 40 is not enabled. Memory cell 2 thus remains in the state it assumed during the second time slot, i.e., its $x$ output terminal remains in the binary "1" state. Timing pulse D3 sets the memory cell 3, however, causing its $x$ output terminal to assume the "1" state, thereby connecting switch 13 to the reference source E. Reference current flows from the reference source E through the resistors 22 and 23 so that a total of 21 units of reference current is fed to the summing node 20 and there compared with the message sample. Realizing that the reference current is still less in absolute magnitude than the message current is, the output of circuit 30 remains deactivated. During time slot 3, the delay interval of the read-out delay circuit 74, having expired, read-out pulses D3* are supplied to both of the AND gates 80 and 84. Since the $x$ output terminal of memory cell 2 is in the "1" state (see waveform 104 of FIG. 2) while the $x$ output terminal of memory cell 1 is in the "0" state (see waveform 102), the read-out pulses D3* succeed in enabling AND gate 84 only, thereby supplying a "symbol two output" to the output summing resistor 86 (see waveform 122). This "symbol two output" passes through the summing output resistor 86, the output summing node 88, and summing amplifier 90 to the encoder output terminal 92 where it appears as shown in waveform 126 of FIG. 2.

At time D4 (the fourth time slot) a timing pulse is supplied from the timing source 34 to the OR gate 58 of memory cell 3, thereby resetting the cell and causing its $x$ output terminal to revert to the "0" state. At the same time, inhibit gate 66 is enabled (recall that the feedback conductor 36 is presently deactivated), thereby causing memory cell 4 to change its state of equilibrium. Memory cell 4, in turn, causes the switch 14 to connect the resistor 24 to the reference source E. Current now flows through the resistors 22 and 24 to the summing node 20. The reference current now exceeds in absolute magnitude the message current (see waveform 100 of FIG. 2) and the difference between these quantities succeeds in triggering the regenerative circuit 30 (see waveform 114 of FIG. 2).

At time D5 (the fifth time slot), therefore, the timing pulse supplied from timing source 34 will enable the AND gate 48 and the OR gate 60, thus causing the $x$ output terminal of memory cell 4 to revert to the "0" state. At the same time (time D5), AND gate 46 and OR gate 56 are enabled thus again setting memory cell 3. The $x$ output terminal of memory cell 3 is therefore in the "1" state. The D5 timing pulse, having overcome the delay interval of read-out delay circuit 94, emerges therefrom as the read-out pulse D5* and enables the AND gate 128. A positive pulse is supplied to the read-out conductor 72 and fed into the inverting amplifier 82, emerging therefrom as a "symbol one output" at the output summing resistor 83 (see waveform 124 of FIG. 2). This "symbol one output" progresses through output summing resistor 83, the node 88 and summing amplifier 90, and appears at the output terminal 92 as a negative pulse (see waveform 126).

In addition to setting and resetting memory cells 3 and 4, and performing the read-out process necessary to establish the proper coefficient at the output terminal 92, timing pulse D5 enables OR gate 62 thereby causing the $x$ output terminal of memory cell 5 to assume the "1" state. During time slot 5, therefore, current flows through resistors 22, 23 and 25 to the summing node 20. The total reference current supplied by way of these resistors is shown as being equal to 22 units in waveform 100. Since the result of the message-reference comparison at summing node 20 shows a preponderance of reference current, the circuit 30 remains in its activated state, so that its output continues to supply an enabling potential to the delay circuit 32 and thence to the feedback conductor 36.

Consequently, when the timing pulse D6 is supplied from timing source 34 to the inhibit gate 68, it is of no effect and inhibit gate 68 remains disabled. Timing pulse D6 enables OR gate 64, however, resetting memory cell 5 and ultimately causing the cessation of the current through resistor 25. Current now flows only through resistors 22 and 23 to the summing node 20. The aggregate current through these resistors is less in absolute magnitude than the message sample is, so that circuit 30 reverts to its stable state. The feedback conductor 36 will thus be disabled during time slot 7.

When, therefore, the timing pulse D7 is supplied by timing source 34 to the AND gate 50, it is of no effect and AND gate 50 is not enabled; nor are the read-out pulses D7* effective in enabling the AND gates 132 and 134, for neither of the $x$ output terminals of memory cells 5 or 6 is in the "1" state during time slot 7. Consequently, current continues to flow only through resistors 22 and 23 (a total of 21 units) and the code finally emerging at the output 92 as the PCM representative of the message sample is as shown in waveform 126.

The significance of waveform 126 is as follows. The pulse 136 indicates that the most significant coefficient $a_2$ (see Equation 2) is equal to two; the negative pulse 138 indicates that the second most significant coefficient $a_1$ is equal to one; and the absence of a pulse during time slot 7 indicates that the least significant coefficient $a_0$, is equal to zero. The aggregate code value of these digits is therefore $$2\times3^2+1\times3^1+0\times3^0=21$$

The final step in the encoding process is achieved by the timing pulse D8 which resets each of the memory cells 1 to 6, causing all of their $x$ output terminals to revert to the "0" state and, consequently, all of the resistors 21 to 26 to be connected to ground. The encoder is thus ready to convert the next sample to a ternary code.

What has been said serves to illustrate the manner in which the invention permits more efficient use of the multilevel pulse trains presently employed in binary systems. We have seen how permutation codes of base greater than two may be produced simply and economically in accordance with the invention. At the same time, the noise advantages of binary PCM are retained. The resultant increase in transmission capacity or reduction of bandwidth requirements, depending upon choice, is readily perceived. Whereas, for example, a ternary system employing five digits can define 243 quantum levels, to accomplish comparable definition in a binary system, eight digits are required.

In the foregoing description, the invention has been illustrated by apparatus for converting analog information to a ternary code. The principles of the invention may, however, be extended to apparatus for conversion of such information to permutation codes of still higher bases. The arrangement of the illustrative encoder of FIG. 1 is such that higher-base codes are readily attainable with a minimal increase in circuit complexity. Progression to these higher bases does not necessarily require an additional reference branch (e.g., resistance branch 21) for each new value that the digit coefficients may assume. Combinations of reference branches may be invoked to the fullest extent. Thus, for example, a quadrinary version of FIG. 1 would require no additional reference branches.

It should be understood, therefore, that the above-described arrangement is an illustrative application of the principles of the invention. Other arrangements may be devised by those skilled in the art without departing from the invention's spirit and scope.

What is claimed is:

1. An encoder to convert a message sample to a permutation code of base three, said code physically comprising positive and negative pulses occupying preassigned time slots in a time pattern and representing in order of significance and time the digits $a_{N-1}3^{N-1}, \ldots a_1 3^1, a_0 3_0$, where N equals the number of digits employed in said code and the coefficients $a$ may each equal 0, 1, or 2, comprising an input to receive said sample; an output for transmitting the code representation of said sample; a source of reference current; N reference-current networks, each network comprising two companion branches, one for passing twice the reference current from said source that the other does; the ohmic values of all the branches of all said networks being interrelated as are the powers of three; comparison means for comparing said sample with the currents passed to said comparison means from said networks; control means, responsive to said comparison means, for determining and then selecting which of the branches, if any, in each of said networks is ultimately to pass current to said comparison means to offset said sample; said control means including a memory circuit for each of said branches for recording the determinations of said control means, and switching means to pass current from said source of direct current through said branches at appropriate times; read-out means interconnecting each said memory circuit to said code output for reading out said determinations stored in each said memory circuit; and timing means to synchronize said control means and said read-out means in accordance with said time pattern.

2. An encoder in accordance with claim 1 in which said read-out means comprises means to transmit from each said memory circuit to said output a pulse of one polarity if the memory circuit has recorded that its associated branch was selected ultimately to pass current to said comparison means and said associated branch passes twice the reference current that its companion branch passes, a pulse of the opposite polarity if said associated branch was so selected but passes only half the reference current that its companion branch passes, or no pulse at all if said associated branch was not so selected.

3. An encoder in accordance with claim 2 wherein each of said read-out circuits is associated with a specified pair of said memory cells and comprises a pair of AND gates, each having an output and two inputs, one of which is connected to the output of a respective one of said pair of memory cells; a delay circuit having an input connected to said timing source and having a pair of outputs; means connecting each of said delay circuit outputs to a respective one of the other of said two inputs of each AND gate; and individual means connecting each of said AND gate outputs to said code output.

4. An encoder in accordance with claim 3 in which said individual means connecting one of said AND gate outputs to said code output comprises an inverting amplifier.

5. An encoder in accordance with claim 2 in which said means interconnecting said output of said regenerative circuit with at least one input of each of said memory cells includes a delay circuit having a delay interval substantially equal to the duration of one of said time slots.

6. An encoder in accordance with claim 5 wherein said at least one input of each of said memory cells comprises said set input and wherein said logic circuitry interconnecting said output of said regenerative circuit and said source of timing pulses with the set inputs of the 1st, 3rd, . . .(2N−1)th of said memory cells comprises, as to each of said odd-ordered memory cells, an OR gate and an AND gate each having a pair of inputs, one of which is connected to said timing source, and each having an output, the output of said AND gate being the other of said pair of OR gate inputs and the output of said OR gate being connected to said set input, and means connecting the other of said pair of AND gate inputs to the delayed side of said delay circuit.

7. An encoder for converting an analog sample into a ternary code in the form of an N-digit pulse group whose code value $x$ may be represented by the expression $$x = a_0 3^0 + a_1 3^1 + a_2 3^2 + \ldots a_{N-1} 3^{N-1}$$

where the coefficients $a_0$, $a_1$, $a_2$ each may be equal to 0, 1, or 2, comprising: a message input for receiving said sample; a code output for transmitting said pulse group; a reference network comprising a source of reference potential and a plurality of N pairs of resistors interrelated in ohmic value as the powers of three; a plurality of 2 N switching circuits each associated with one of said resistors to switch its associated resistor from ground to said reference source in response to an activating pulse; means for comparing reference current from said reference network with said sample to derive a difference signal; a monostable regenerative circuit for maintaining a pulse at its output only when said difference signal represents a preponderance of reference current; a plurality of 2 N memory cells, each being connected to an associated one of said 2 N switching circuits and having two stable states of equilibrium, and each supplying an activating pulse to its associated switching circuit when in one of said states of equilibrium; a source of timing pulses for synchronizing the operation of said encoder; logic circuitry interconnecting said regenerative circuit output and said timing pulse source with each of said memory cells to determine the states of equilibrium of said cells; a plurality of N read-out circuits, responsive to said timing source, for appraising the states of equilibrium of associated ones of said cells at specified times; and means interconnecting said read-out circuits and said code output for symbolizing said appraisals as pulse representations of said expression for said code value $x$.

References Cited in the file of this patent

UNITED STATES PATENTS

| | | |
|---|---|---|
| 2,902,542 | Treadwell | Sept. 1, 1959 |
| 2,945,220 | Lesti | July 12, 1960 |
| 2,950,348 | Mayer | Aug. 23, 1960 |
| 2,980,765 | Holloway | Apr. 18, 1961 |

UNITED STATES PATENT OFFICE

CERTIFICATE OF CORRECTION

Patent No. 3,032,610 May 1, 1962

Claude P. Villars

It is hereby certified that error appears in the above numbered patent requiring correction and that the said Letters Patent should read as corrected below.

Column 9, line 43, after "selected." insert the following claim:

3. An encoder for converting an analog signal to a permutation code of base b greater than two, said code comprising N-digit pulse groups encompassed by a matrix of time slots, each group representing a sample of said analog signal, each of said digits being some ith power of said base b and having a corresponding multiplication coefficient $a_i$, the code value x of each of said groups thus being represented by the expression $$x = \sum_{i=0}^{N-1} a_i b^i$$

where $a_i$=0, 1, 2,...(b-1), and i = 0, 1, 2,...(N-1), said encoder comprising: a message input to receive said analog signal samples; a code output for transmitting said $a_i b_i$; a reference-signal generator comprising a source of reference potential and a plurality of 2N resistors arranged in pairs, the ohmic values of the resistors of each pair being related as the powers of two and the ohmic values of all of the resistors of said pairs being related as the powers of said base b; a plurality of 2N switching circuits each associated with one of said resistors for switching its associated resistor from ground to said potential source in response to an activating pulse; a summing node; conductor means for conveying to said summing node reference currents from said generator and said analog sample from said message input to derive a difference signal; a monostable regenerative circuit for generating an output pulse in response to said difference signal only when said difference signal indicates that said reference current is greater in absolute magnitude than said analog sample; a plurality of 2N memory cells each being associated with one of said 2N switching circuits and each having: two states of equilibrium, a set input to establish one state when impulsed, a reset input to establish the other state when said set input is impulsed; means connecting said output of each of said memory cells to its associated switching circuit for activating said switching circuit; a source of timing pulses for determining the occurrence of said time slots; means including logic circuitry, interconnecting said output of said regenerative circuit and said source of timing pulses with at least one input of each of said memory cell inputs for determining the states of equilibrium of said cells; a plurality of N read-out circuits, connected to said cell outputs and said code output and responsive to said timing source, for appraising the states of equilibrium of associated ones of said memory cells at specified times and for symbolizing said appraisals as pulse representations of said $a_i b^1$.

same column 9, line 44, for "2. An encoder in accordance with claim 2" read -- 4. An encoder in accordance with claim 3 --; line 56, for "4. An encoder in accordance with claim 3" read -- 5. An encoder in accordance with claim 4 --; line 60, for "5. An encoder in accordance with claim 2" read -- 6. An encoder in accordance with claim 3 --; column 10, line 6, for "6. An encoder in accordance with claim 5" read -- 7. An encoder in accordance with claim 6 --; line 20, for the claim numbered "7" read -- 8 --; in the heading to the printed specification, line 8, for "7 Claims." read -- 8 Claims. --.

Signed and sealed this 2nd day of October 1962.

(SEAL)
Attest:

ERNEST W. SWIDER
Attesting Officer

DAVID L. LADD
Commissioner of Patents